US009806307B2

(12) United States Patent
Zheng et al.

(10) Patent No.: US 9,806,307 B2
(45) Date of Patent: Oct. 31, 2017

(54) BATTERY MODULE

(71) Applicant: Ningde Amperex Technology Limited, Ningde (CN)

(72) Inventors: Yulian Zheng, Ningde (CN); Zhijun Guo, Ningde (CN); Peng Wang, Ningde (CN); Pinghua Deng, Ningde (CN)

(73) Assignee: NINGDE AMPEREX TECHNOLOGY LIMITED, Ningde, Fujian Province (CN)

( * ) Notice: Subject to any disclaimer, the term of this patent is extended or adjusted under 35 U.S.C. 154(b) by 289 days.

(21) Appl. No.: 14/630,450

(22) Filed: Feb. 24, 2015

(65) Prior Publication Data
US 2016/0020446 A1    Jan. 21, 2016

(30) Foreign Application Priority Data
Jul. 17, 2014   (CN) .......................... 2014 1 0340962

(51) Int. Cl.
*H01M 2/10* (2006.01)
*H01M 2/20* (2006.01)
*H01M 10/6556* (2014.01)

(52) U.S. Cl.
CPC ....... *H01M 2/1094* (2013.01); *H01M 2/1016* (2013.01); *H01M 2/202* (2013.01); *H01M 10/6556* (2015.04); *H01M 2/1077* (2013.01)

(58) Field of Classification Search
CPC .. H01M 2/1094; H01M 2/202; H01M 2/1016; H01M 2/1077; H01M 10/6556
See application file for complete search history.

(56) References Cited

U.S. PATENT DOCUMENTS

2004/0137323 A1    7/2004 Sato
2012/0121949 A1*   5/2012 Eberhard .............. H01M 2/105
                                                  429/82

FOREIGN PATENT DOCUMENTS

| CN | 102055003 A | 5/2011 |
| CN | 102422480 A | 4/2012 |
| CN | 102593389 A | 7/2012 |
| CN | 102623749 A | 8/2012 |
| CN | 102790246 A | 11/2012 |
| CN | 203312403 U | 11/2013 |

* cited by examiner

*Primary Examiner* — Jane Rhee
(74) *Attorney, Agent, or Firm* — Morgan, Lewis & Bockius LLP

(57) ABSTRACT

The present disclosure provides a battery module, which comprises: a plurality of mono-batteries arranged in a manner that side surfaces are adjacent to each other; an insulative casing receiving the plurality of mono-batteries; a supporting frame fixed in the insulative casing, provided with a potting hole, and holding the plurality of mono-batteries therein; and a separating body which is formed by injecting via the potting holes and curing and is potted among the adjacent mono-batteries, so as to allow the plurality of mono-batteries to be insulated and isolated from each other. When one mono-battery is involved in a safety problem and leaks, other mono-batteries are not affected due to the isolation of the separating body potted among the adjacent mono-batteries, so as to improve the safety performance of the battery module. In addition, the battery module has the advantages of simple structure, small size, and low cost.

20 Claims, 6 Drawing Sheets

BATTERY MODULE

CROSS-REFERENCE TO RELATED APPLICATIONS

The present application claims priority to Chinese patent application No. 201410340962.1 filed on Jul. 17, 2014, which is incorporated herein by reference in its entirety.

TECHNICAL FIELD OF THE PRESENT DISCLOSURE

The present disclosure relates to the field of energy storage devices, and particularly relates to a battery module.

BACKGROUND OF THE PRESENT DISCLOSURE

Because lithium-ion batteries have the advantages of high energy, high density, long storage life, and small size, the lithium-ion battery modules have been widely used in the fields of electric vehicles and energy storage. Because sustainability of the electric vehicle is not very high in general, a large number of lithium-ion batteries need to be connected in series or in parallel to improve the sustainability of the battery module.

At present, large-capacity rectangular batteries are only experimental products, that is because the rectangular battery has a large volume, it is difficult to ensure the safety performance after the rectangular batteries are assembled to form a module, and cost of the rectangular battery module and cost of the mono-rectangular battery are high. In contrast, steel-shell cylindrical lithium-ion batteries are more mature in technology, but the steel-shell cylindrical lithium-ion battery has low energy density, and when a plurality of mono-batteries are connected in series, once one battery fails, it is possible to cause serious safety problem with the whole battery module.

SUMMARY OF THE PRESENT DISCLOSURE

In view of the problem existing in the background, an object of the present disclosure is to provide a battery module, which can improve the safety performance of the battery module.

In order to achieve the above object, the present disclosure provides a battery module, which comprises: a plurality of mono-batteries arranged in a manner that side surfaces are adjacent to each other; an insulative casing receiving the plurality of mono-batteries; a supporting frame fixed in the insulative casing, provided with a potting hole, and holding the plurality of mono-batteries therein; and a separating body which is formed by injecting via the potting holes and curing and is potted among the adjacent mono-batteries, so as to allow the plurality of mono-batteries to be insulated and isolated from each other.

The present disclosure has the following beneficial effects:

In the battery module according to the present disclosure, when one mono-battery is involved in a safety problem and leaks, other mono-batteries are not affected due to the isolation of the separating body potted among the adjacent mono-batteries, so as to improve the safety performance of the battery module. In addition, the battery module has the advantages of simple structure, small size, and low cost.

Figure 1:
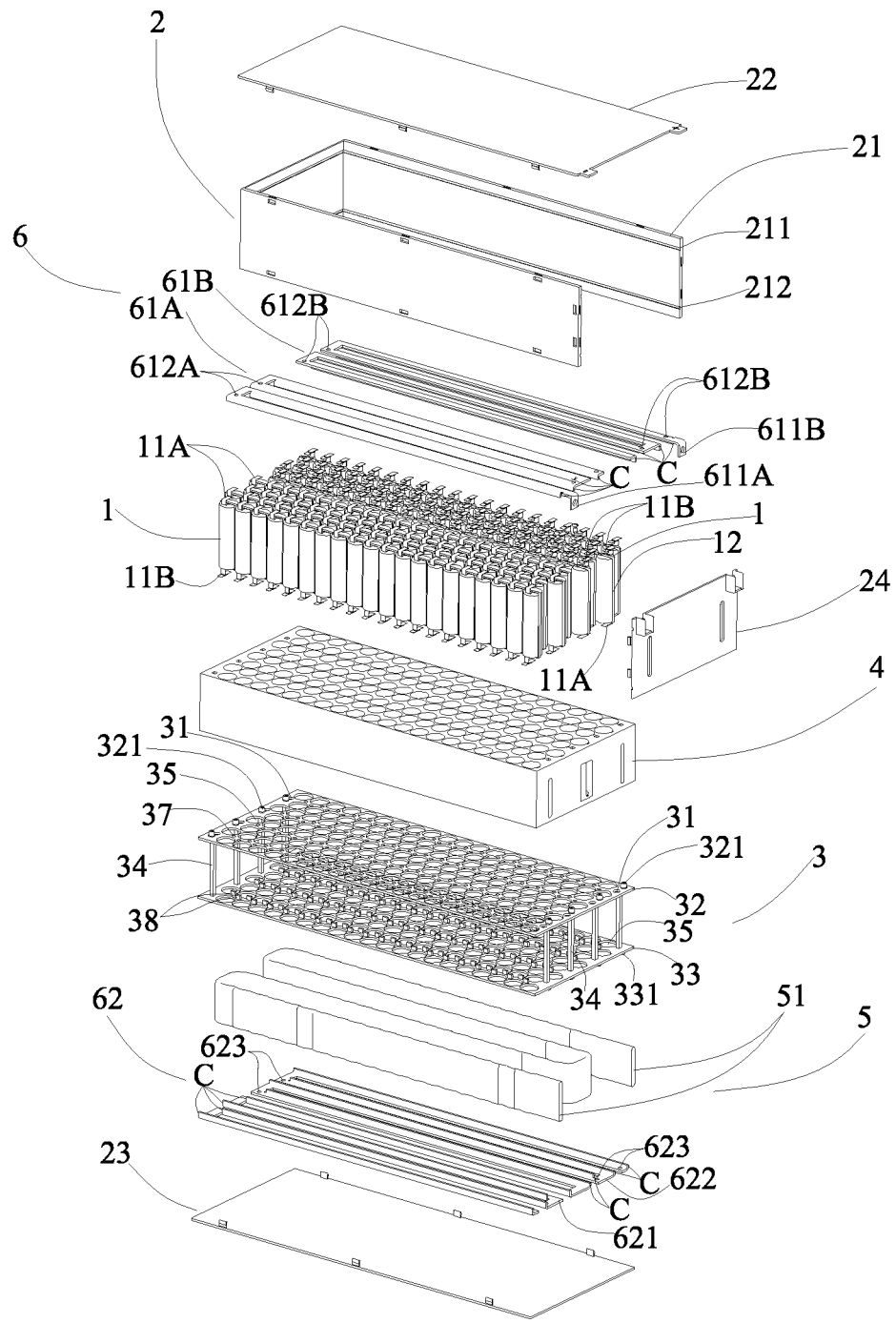
FIG. 1 is an exploded view of a battery module according to the present disclosure, in which an electrode tab has been bent for purpose of presenting a welding state of the electrode tab.

Reference numerals of the embodiments are represented as follows:

1 mono-battery
   11A first electrode tab
   11B second electrode tab
      111 cutout
   12 side packaging edge
   13 end packaging edge
      131 notch
2 insulative casing
   21 side plate
      211 upper latching groove
      212 lower latching groove
   22 upper cover
   23 lower cover
   24 side cover
3 supporting frame
   31 potting hole
   32 upper supporting frame portion
      321 upper positioning pin
   33 lower supporting frame portion
      331 lower positioning pin
   34 supporting pillar
   35 battery receiving hole
   36 battery positioning groove
   37 vent hole
   38 staggered rib
4 separating body
5 temperature control tube
   51 end portion
6 connecting piece
   61A first upper piece body
      611A first master output end
      612A upper positioning hole
      613A first welding hole
   61B second upper piece body
      611B second master output end
      612B upper positioning hole
      613B second welding hole
   62 lower piece body 621 first connecting portion
6211 third welding hole
622 second connecting portion
6221 fourth welding hole
623 lower positioning hole
C curved portion
T bent piece
H vent aperture

DETAILED DESCRIPTION

While the present disclosure may be susceptible to embodiments in different forms, there is shown in the Figures, and herein will be described in detail, specific embodiments with the understanding that the present disclosure is to be considered an exemplification of the principles of the present disclosure, and is not intended to limit the present disclosure to that as illustrated and described herein. Therefore, unless otherwise noted, features disclosed herein may be combined together to form additional combinations that were not otherwise shown for purposes of brevity.

In the embodiments illustrated in the Figures, representations of directions such as up, down, left, right, front and rear are used for explaining the structure and movement of the various elements of the present disclosure. These representations are appropriate when the elements are in the position shown in the Figures. If the description of the position of the elements changes, however, these representations are to be changed accordingly.

Hereinafter a battery module according to the present disclosure will be described in detail in combination with the figures.

Referring to FIGS. 1-11, a battery module according to the present disclosure comprises: a plurality of mono-batteries 1 arranged in a manner that side surfaces are adjacent to each other; an insulative casing 2 receiving the plurality of mono-batteries 1; a supporting frame 3 fixed in the insulative casing 2, provided with a potting hole 31, and holding the plurality of mono-batteries 1 therein; and a separating body 4 which is formed by injecting via the potting holes 31 and curing and is potted among the adjacent mono-batteries 1, so as to allow the plurality of mono-batteries 1 to be insulated and isolated from each other. Here, it should be noted that, the curing has a broad meaning, which includes physical curing and chemical curing.

In the battery module according to the present disclosure, when one mono-battery 1 is involved in a safety problem and leaks, other mono-batteries 1 are not affected due to the isolation of the separating body 4 potted among the adjacent mono-batteries 1, so as to improve the safety performance of the battery module. In addition, the battery module has the advantages of simple structure, small size, and low cost.

In an embodiment of the insulative casing 2, referring to FIG. 1 and FIG. 2, the insulative casing 2 may comprise: a side plate 21 surrounding three sides of an assembly of the plurality of mono-batteries 1; an upper cover 22 connected to the side plate 21 in a sealing way above the side plate 21; a lower cover 23 connected to the side plate 21 in a sealing way below the side plate 21; and a side cover 24 connected to the side plate 21, the upper cover 22, the lower cover 23 in a sealing way on the other side of the assembly of the plurality of mono-batteries 1. In an embodiment, the insulative casing 2 may be an integrally formed structure. In another embodiment, referring to FIG. 1, the insulative casing 2 may be a separated structure. When the insulative casing 2 is a separated structure, the side plate 21, the upper cover 22, the lower cover 23, and the side cover 24 are connected in a sealing way by riveting, welding, or snap-fit (referring to FIG. 2).

In an embodiment of the insulative casing 2, the insulative casing 2 is a polymer material, or a metal material treated by insulation treatment.

In an embodiment of the battery module according to the present disclosure, the separating body 4 may be a fire-retardant insulation material, a thermally conductive insulation material, or a fire-retardant thermally conductive insulation material. The fire-retardant insulation material, the thermally conductive insulation material, or the fire-retardant thermally conductive insulation material may be a polymer or an inorganic matter. Specifically, when the separating body 4 is a polymer, the separating body 4 can be formed by chemical curing (that is chemical polymerization) of monomer of polymer or prepolymer in fluid state injected into the insulative casing 2 via the potting hole 31, or the separating body 4 can be formed by physical curing (that is solvent evaporation) of a polymer solution injected into the insulative casing 2 via the potting hole 31. When the separating body 4 is an inorganic matter, the separating body 4 can be formed by physical curing (that is solvent evaporation) of an inorganic matter solution injected into the insulative casing 2 via the potting hole 31. In addition, when the separating body 4 is a thermally conductive material, the separating body 4 facilitates heat conduction among the mono-batteries 1 so as to facilitate heat dissipation of the mono-batteries 1.

In an embodiment of the separating body 4, the separating body 4 may have elasticity, thereby buffering shock in the process of using the battery module, and preventing safety problems caused by collision among the mono-batteries 1 and detachment of the mono-batteries 1 from the separating body 4.

In an embodiment, the side plate 21 of the insulative casing 2 is provided with an upper latching groove 211 and a lower latching groove 212; the supporting frame 3 comprises: an upper supporting frame portion 32 engaged with the upper latching groove 211 of the side plate 21; and a lower supporting frame portion 33 spaced apart from the upper supporting frame portion 32 and located below the upper supporting frame portion 32 and engaged with the lower latching groove 212 of the side plate 21.

In an embodiment, referring to FIG. 1, FIG. 3, FIG. 4 and FIG. 5, the potting holes 31 may be provided on both ends of the upper supporting frame portion 32.

Figure 3:
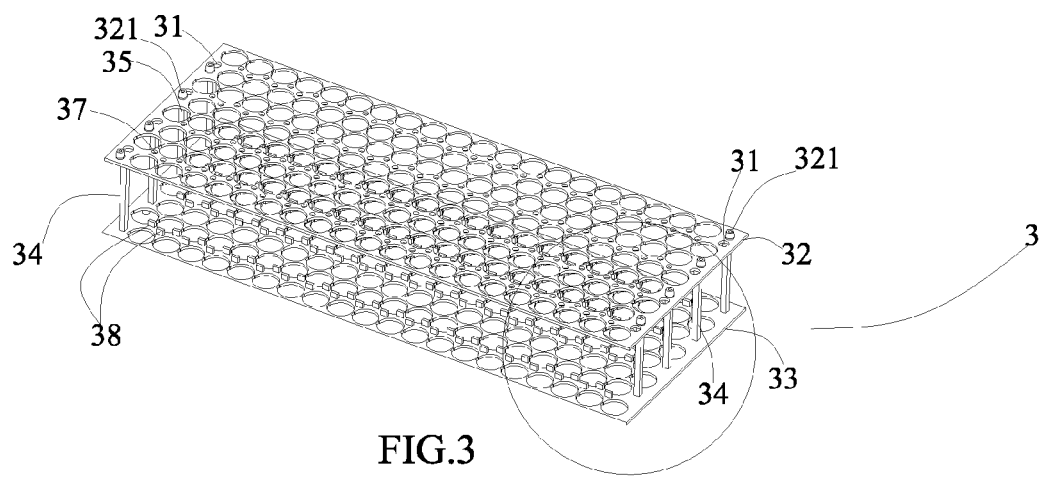
FIG. 3 is a perspective view of a supporting frame of the battery module according to the present disclosure.

In an embodiment, referring to FIG. 1 and FIG. 3, the supporting frame 3 may further comprise a supporting pillar 34 connecting the upper supporting frame portion 32 and the lower supporting frame portion 33. But the present disclosure is not limited to the examples shown in the Figures, the supporting frame 3 and the insulative casing 2 may be also engaged and connected by way of step and the like.

In an embodiment, referring to FIG. 1, FIG. 3, FIG. 4, FIG. 5 and FIG. 6, the upper supporting frame portion 32 and the lower supporting frame portion 33 may be provided with battery receiving holes 35 formed in pairs correspondingly, the each mono-battery 1 is inserted into the respective pair of battery receiving holes 35.

In an embodiment, referring to FIG. 1 and FIGS. 3-5, the mono-battery 1 is a soft package battery, the mono-battery 1 has a side packaging edge 12; the each battery receiving hole 35 of the upper supporting frame portion 32 and the lower supporting frame portion 33 is provided with a battery positioning groove 36 at an edge of the each battery receiving hole 35, so as to correspondingly receive and fix the side packaging edge 12 of the corresponding mono-battery 1. Therefore, the mono-battery 1 can be positioned. In addition, the energy density and the volume density of the battery module can be greatly improved when the mono-battery 1 is a soft package battery.

In an embodiment, referring to FIG. 1, FIG. 3, FIG. 4 and FIG. 5, the upper supporting frame portion 32 may be provided with vent holes 37 provided between the adjacent battery receiving holes 35. During the process of forming the separating body 4 by injecting via the potting hole 31 and curing, the vent hole 37 can discharge air bubbles in time, so as to allow the monomer of polymer or prepolymer in a fluid state to be uniformly distributed. In addition, the vent hole 37 may further function as the same as the potting hole 31, that is, when the insulative casing 2 is not fully filled with the precursor (monomer of polymer or prepolymer) in fluid state or solution (polymer solution or inorganic matter solution) used for forming the separating body 4, secondary filling may be performed via the vent hole 37.

Figure 2:
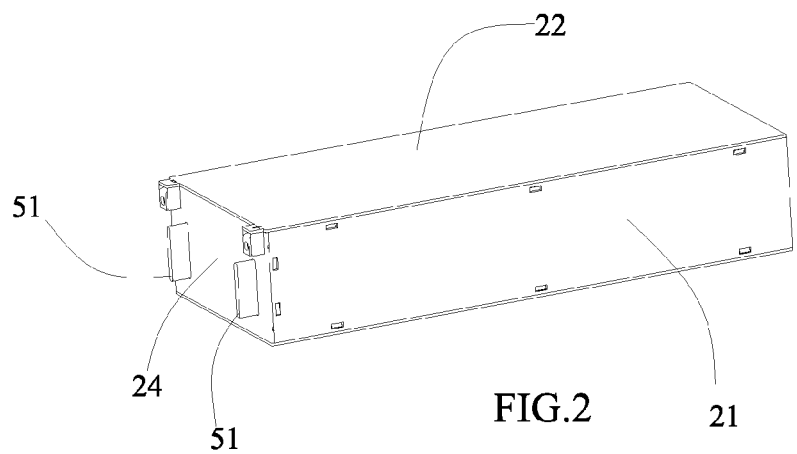
FIG. 2 is a perspective view of the battery module according to the present disclosure.
Figure 4:
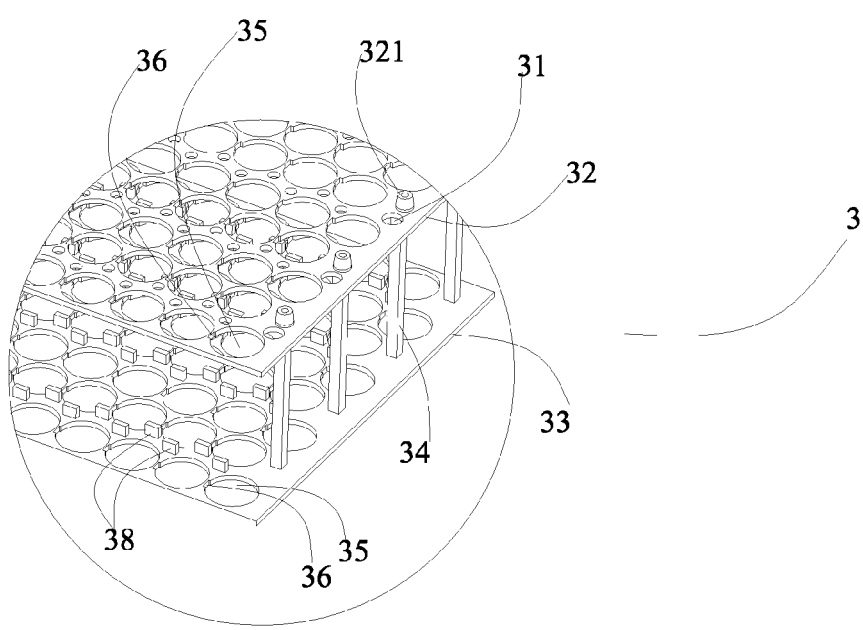
FIG. 4 is an enlarged view of a circled portion of FIG. 3.
Figure 5:
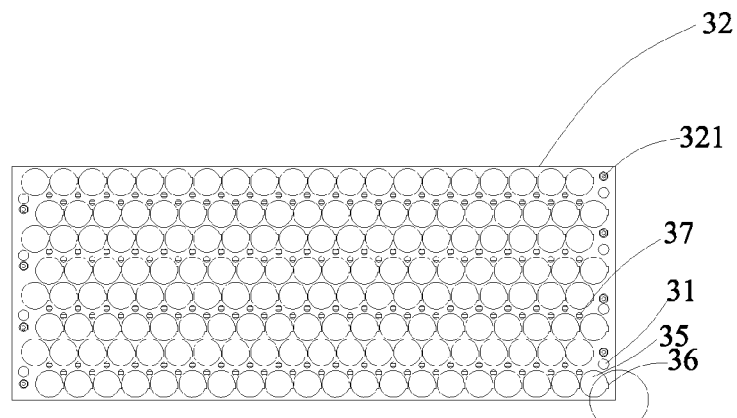
FIG. 5 is a top view of FIG. 3.
Figure 6:
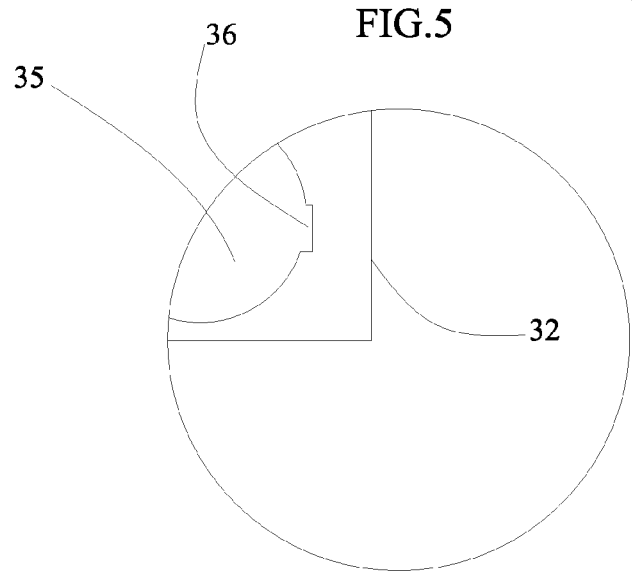
FIG. 6 is an enlarged view of a circled portion of FIG. 5.

In an embodiment, referring to FIG. 4, the supporting frame 3 may further comprise: staggered ribs 38 provided on the lower supporting frame portion 33 and located between the adjacent battery receiving holes 35; correspondingly, referring to FIG. 1 and FIG. 2, the battery module may further comprise: a temperature control tube 5 provided with a heat-transfer medium therein, provided in the supporting frame 3 by latching on the staggered ribs 38 of the lower supporting frame portion 33, and in contact with side surfaces of the each mono-battery 1, and two end portions 51 of the temperature control tube 5 pass through the side cover 24, and the temperature control tube 5 is encapsulated by the potted separating body 4 except parts of the temperature control tube 5 in contact with the side surfaces of the each mono-battery 1. The temperature control tube 5 is provided with the heat-transfer medium therein, the two end portions 51 are communicated with outside, when the temperature of the battery module is higher than a predetermined upper limit temperature, the heat-transfer medium brings the redundant heat out by forming circulation flow with outside; but when the temperature of the battery module is lower than a predetermined lower limit temperature, the heat-transfer medium brings heat into the battery module by the circulation flow with outside. By virtue of the staggered ribs 38 and potting of the separating body 4, the temperature control tube 5 is securely maintained to contact the side surfaces of the each mono-battery 1, and in turn an operating temperature of the each mono-battery 1 of the battery module can be reliably and effectively controlled by the temperature control tube 5. In an embodiment, referring to FIG. 1, the temperature control tube 5 may have a meandering shape.

In an embodiment, referring to FIG. 1, FIGS. 8-9 and FIGS. 10-11, the plurality of mono-batteries 1 each have a first electrode tab 11A and a second electrode tab 11B which are opposite in electrical polarity; the battery module may further comprise: a connecting piece 6 electrically connecting the first electrode tabs 11A and the second electrode tabs 11B of the plurality of mono-batteries 1, and provided with a first master output end 611A and a second master output end 611B which are opposite in electrical polarity.

In an embodiment of the connecting piece 6, referring to FIGS. 8-9 and FIGS. 10-11, the connecting piece 6 may comprise a first upper piece body 61A and a second upper piece body 61B and a lower piece body 62. The first upper piece body 61A and the second upper piece body 61B are provided between the insulative casing 2 and an upper part of the plurality of mono-batteries 1, provided with the first master output end 611A and the second master output end 611B which are opposite in electrical polarity, respectively, the first upper piece body 61A electrically connects the first electrode tab 11A at the upper part of the corresponding mono-battery 1 of the plurality of mono-batteries 1, the second upper piece body 61B electrically connects the second electrode tab 11B at the upper part of the corresponding mono-battery 1 of the plurality of mono-battery 1. The lower piece body 62 is provided between the insulative casing 2 and a lower part of the plurality of mono-batteries 1 and comprises: a first connecting portion 621 electrically connecting the second electrode tab 11B at the lower part of the mono-battery 1 connected to the first upper piece body 61A of the plurality of mono-batteries 1; and a second connecting portion 622 electrically connecting the first electrode tab 11A at the lower part of the mono-battery 1 connected to the second upper piece body 61B of the plurality of mono-batteries 1, and electrically connected to the first connecting portion 621.

Here, it should be noted that, the electrical polarity of the first electrode tab 11A and the second electrode tab 11B can be determined based on an actual situation.

Figure 8:
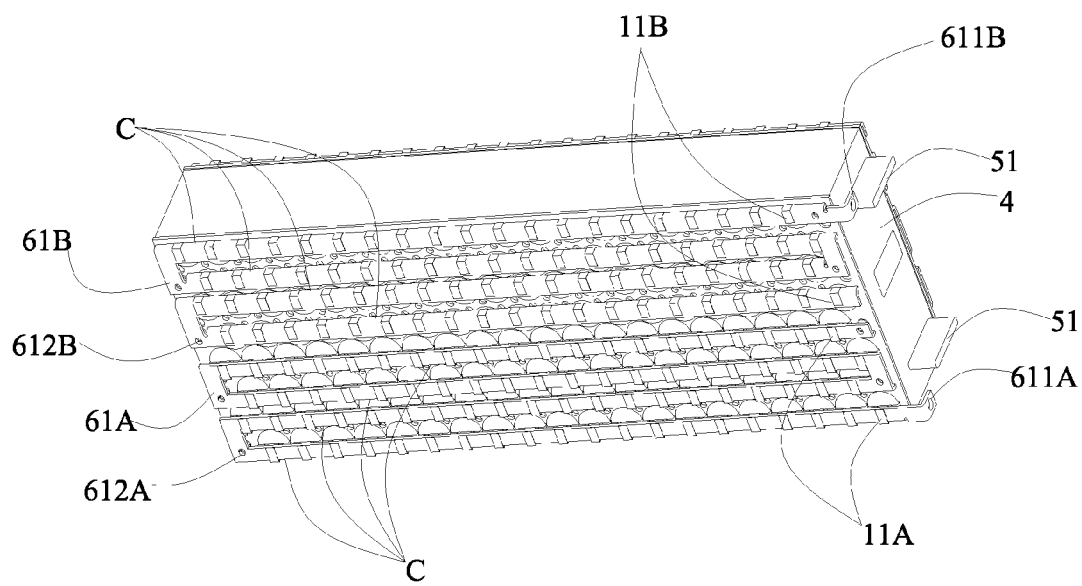
FIG. 8 is an assembly diagram of the battery module of FIG. 1 viewed from an angle, in which an insulative casing is removed.
Figure 9:
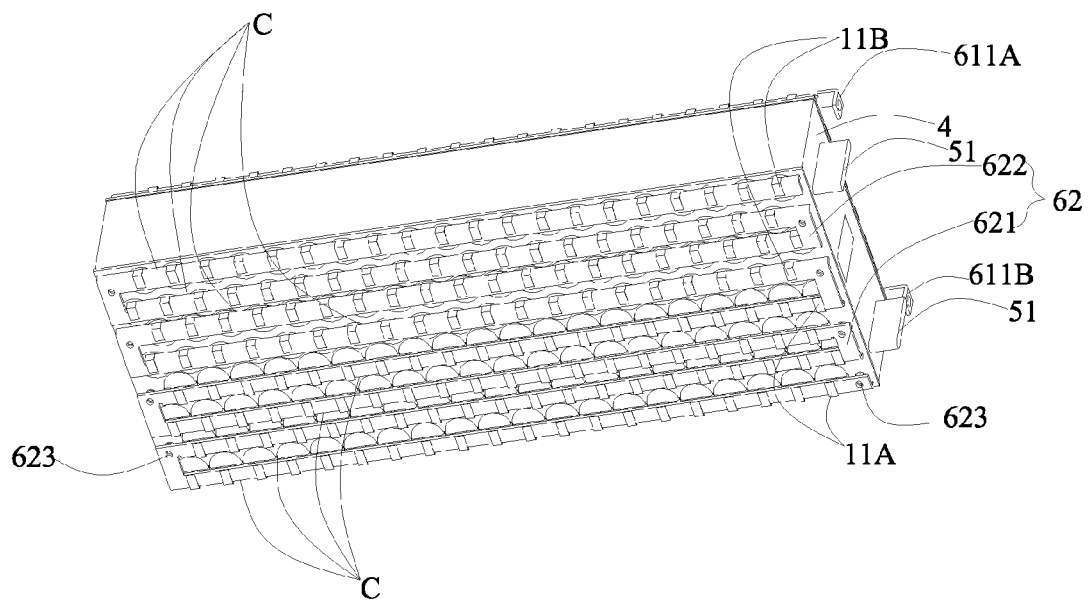
FIG. 9 is an assembly diagram of the battery module of FIG. 1 viewed from another angle, in which the insulative casing is removed.

In an embodiment, referring to FIG. 1, FIG. 8 and FIG. 9, at least one of the first upper piece body 61A, the second upper piece body 61B and the lower piece body 62 may have a curved portion C, so as to allow the corresponding one of the first electrode tab 11A and the second electrode tab 11B of the corresponding mono-battery 1 to bend, abut against and be weld on the curved portion C. When a safety problem occurs, the mono-battery 1 bulges, because the first electrode tab 11A or the second electrode tab 11B abuts against and is welded on the corresponding curved portion C, the electrode tab is subjected to stress, the electrode tab is pulled and broken off, so as to prevent further deterioration of the safety problem. Here, it should be noted that, taking the first upper piece body 61A as an example for components having the curved portion C, the whole or part of the first upper piece body 61A may have the curved portion C.

In an embodiment, referring to FIG. 1, FIG. 8 and FIG. 9, the first upper piece body 61A may have a meandering shape, the second upper piece body 61B may have a meandering shape, the lower piece body 62 may have a meandering shape. The connecting piece 6 has a simple structure, is easy to manufacture, and when the mono-battery 1 is involved in a safety problem, the connecting piece 6 can block the mono-battery 1 inside the battery module to prevent substances inside the mono-battery 1 from ejecting outwardly which will affect other mono-batteries 1 and other structure of the battery module. It is worth noting that, because electrical connection (such as only connection in series, only connection in parallel, and connection in series and in parallel) between mono-batteries 1 of the battery module changes, the shape and the structure of the connecting piece 6 will change correspondingly.

In an embodiment, referring to FIG. 1, FIG. 3, FIG. 4 and FIG. 5, the upper supporting frame portion 32 and the lower supporting frame portion 33 are respectively provided with an upper positioning pin 321 and a lower positioning pin 331; the first upper piece body 61A and the second upper piece body 61B are provided respectively with an upper positioning hole 612A and an upper positioning hole 612B correspondingly receiving the upper positioning pins 321 of the upper supporting frame portion 32; the lower piece body 62 is provided with a lower positioning hole 623 correspondingly receiving the lower positioning pin 331 of the lower supporting frame portion 33. By that the upper positioning pin 321 and the upper positioning holes 612A, 612B are engaged and the lower positioning pin 331 and the lower positioning hole 623 are engaged, electrical connection structure between the connecting piece 6 and the plurality of mono-batteries 1 can be reliably positioned, so as to improve the operation stability.

Figure 10:
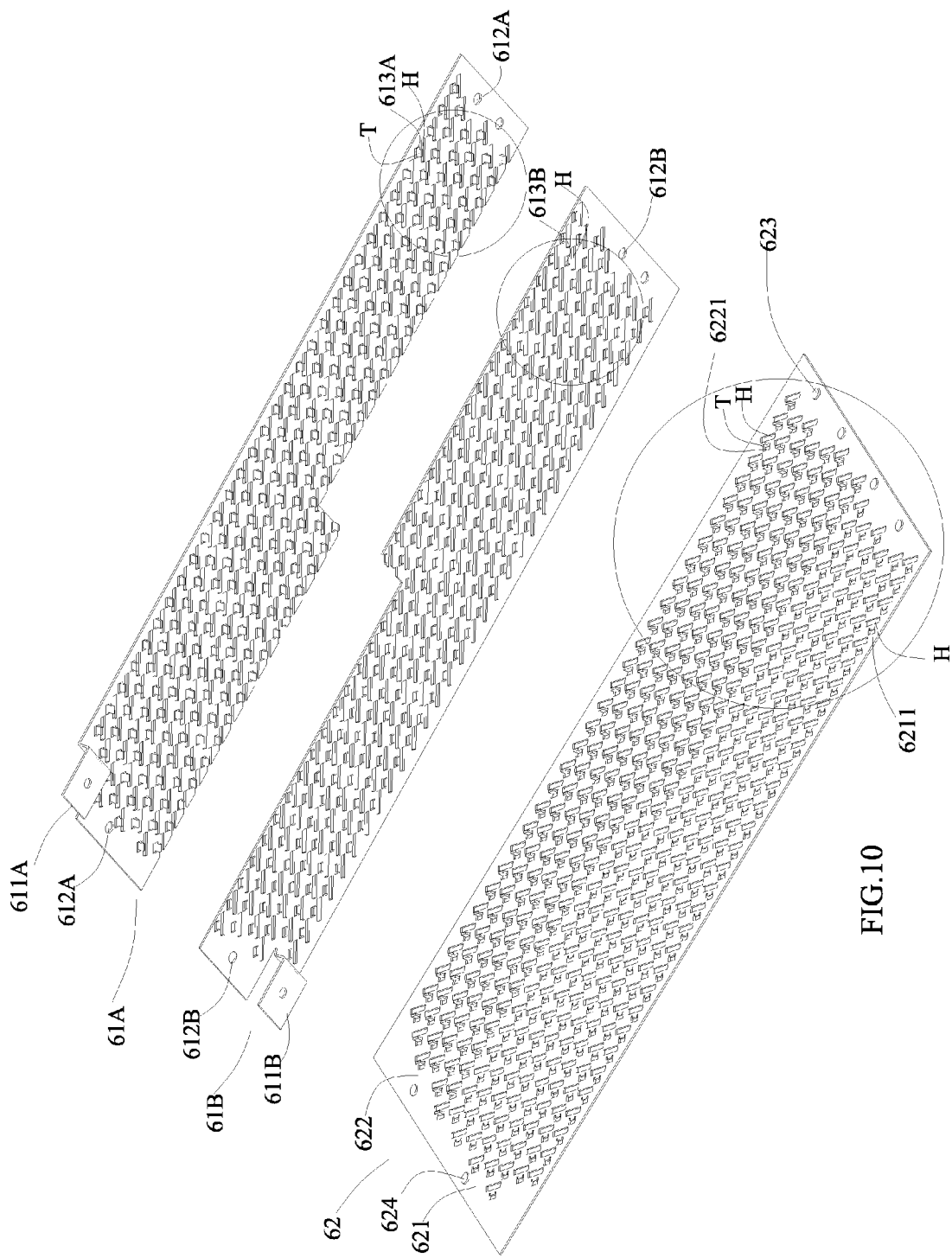
FIG. 10 is an exploded view of an embodiment of a connecting piece of the battery module according to the present disclosure.
Figure 11:
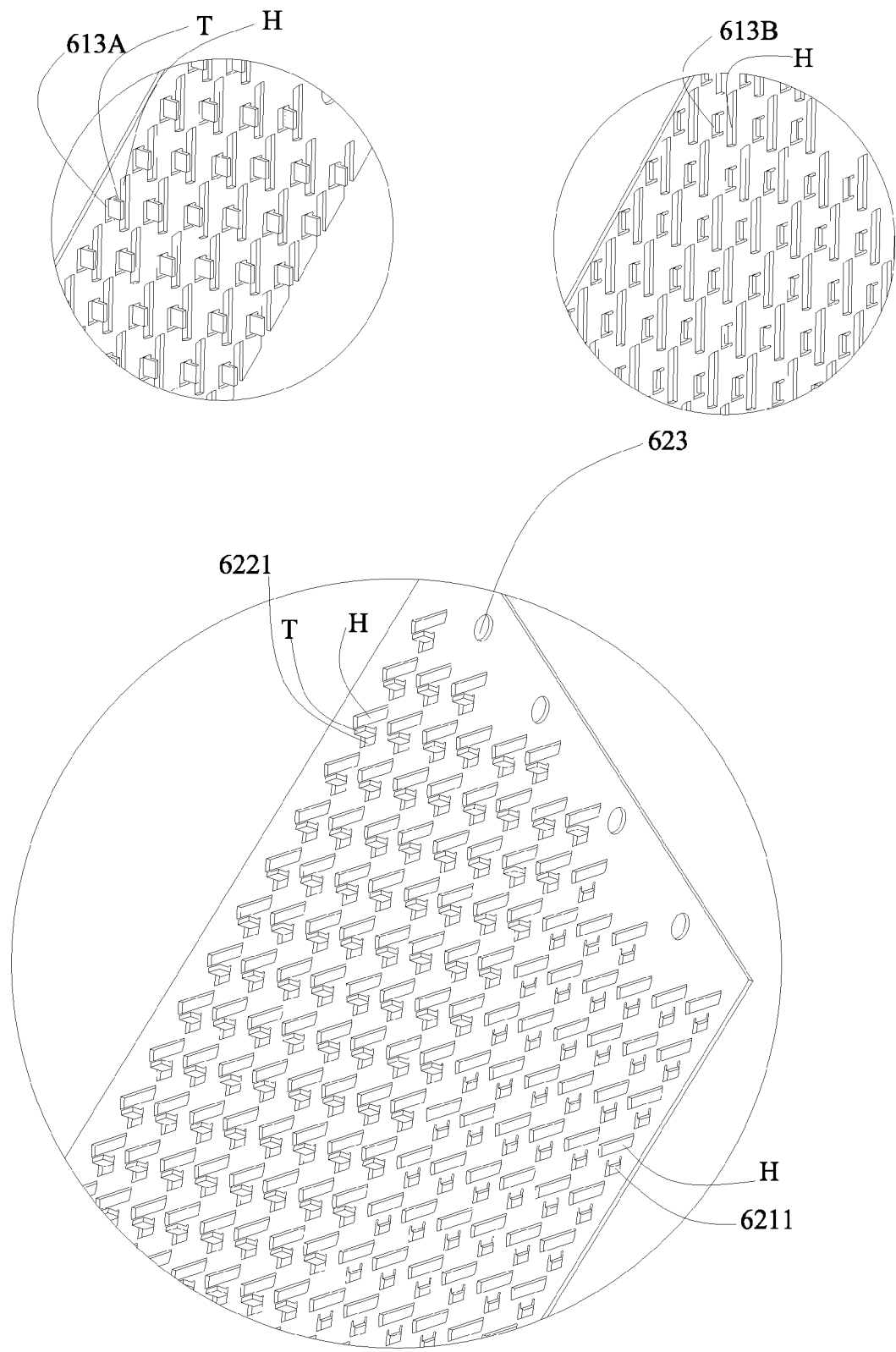
FIG. 11 are enlarged views of three circled portions of FIG. 10.

In another embodiment, referring to FIG. 10 and FIG. 11 and in combination with FIG. 1 (but noted that, the number of the mono-battery 1 to be connected in FIG. 10-11 is different from the number of the mono-battery 1 to be connected in FIG. 1), the first upper piece body 61A has first welding holes 613A, the each first welding hole 613A allows the first electrode tab 11A at the upper part of the corresponding mono-battery 1 of the plurality of mono-batteries 1 to pass through and be weld on the first upper piece body 61A; the second upper piece body 61B has second welding holes 613B, the each second welding hole 613B allows the second electrode tab 11B at the upper part of the corresponding mono-battery 1 of the plurality of mono-batteries 1 to pass through and be weld on the second upper piece body 61B; the first connecting portion 621 of the lower piece body 62 has third welding holes 6211, the each third welding hole 6211 allows electrical connection of the second electrode tab 11B at the lower part of the mono-battery 1 connected to the first upper piece body 61A of the plurality of mono-batteries 1; the second connecting portion 622 of the lower piece body 62 has fourth welding holes 6221, the each fourth welding hole 6221 allows electrical connection of the first electrode tab 11A at the lower part of the mono-battery connected to the second upper piece body 61B of the plurality of mono-batteries 1.

In an embodiment, referring to FIG. 10 and FIG. 11, at least one of the first welding hole 613A, the second welding hole 613B, the third welding hole 6211 and the fourth welding hole 6221 may be formed with a bent piece T which is integrally formed, so as to allow the corresponding one of the first electrode tab 11A and the second electrode tab 11B of the corresponding mono-battery 1 to bend, abut against and be weld on the corresponding one bent piece T of the first upper piece body 61A, the second upper piece body 61B, and the lower piece body 62. When a safety problem occurs, the mono-battery 1 bulges, because the first electrode tab 11A or the second electrode tab 11B abuts against and is welded on the corresponding bent piece T, the electrode tab is subjected to stress, the electrode tab is pulled and broken off, so as to prevent further deterioration of the safety problem. In addition, it also needs to be noted that, taking the first upper piece body 61A as an example, when the first welding hole 613A is formed with the bent piece T which is integrally formed, part of the first welding holes 613A of the first upper piece body 61A may be formed with the bent piece T which is integrally formed, and the other part of the first welding holes 613A may not be formed with the bent piece T which is integrally formed; of course, all the first welding holes 613A may be formed with the bent piece T which is integrally formed as shown in the Figures.

In an embodiment, referring to FIG. 10 and FIG. 11, at least one of the first upper piece body 61A, the second upper piece body 61B, and the lower piece body 62 may be provided with a vent aperture H, preferably all of the first upper piece body 61A, the second upper piece body 61B, and the lower piece body 62 are provided with the vent aperture H.

Here, it should be noted that, the first upper piece body 61A, and the second upper piece body 61B can be collectively referred to as the upper piece body, although the upper piece body is provided as two in number in the Figures, but it is not limited to that, the upper piece body can be a whole piece or more than one mono-piece. Although the lower piece body 62 is provided as one in number in the Figures, but it is not limited to that, the lower piece body 62 can be a whole piece or more than one mono-piece. Because the structural forms of the upper piece body and the lower piece body 62 are diversified, the provision of the first master output end 611A and the second master output end 611B will changes with the diversified structural forms correspondingly.

Figure 7:
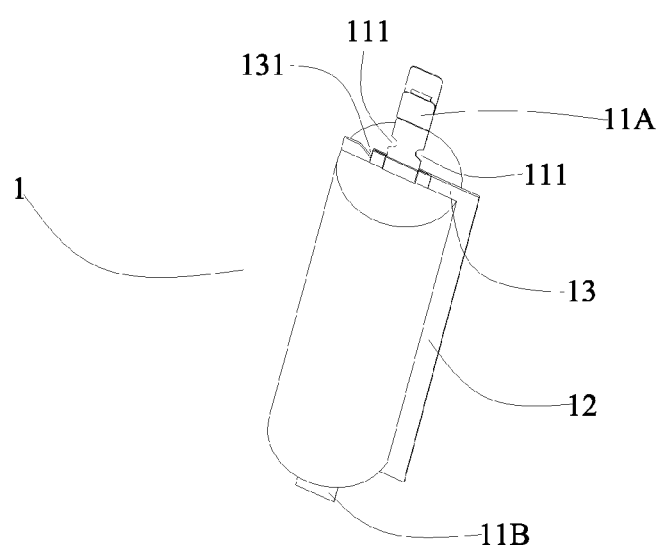
FIG. 7 is a perspective view of an embodiment of a mono-battery of the battery module according to the present disclosure, in which the electrode tab is not bent for welding.

In an embodiment, referring to FIG. 10 and FIG. 11 and in combination with FIG. 7, the mono-battery 1 is a soft package battery, the mono-battery 1 has end packaging edges 13 (that is a top packaging edge and a bottom packaging edge), the first electrode tab 11A and the second electrode tab 11B extend out from the corresponding end packaging edges 13 respectively, and at least one of the first electrode tab 11A and the second electrode tab 11B is provided with at least a cutout 111. By virtue of the cutout 111, the corresponding first electrode tab 11A or second electrode tab 11B can be correspondingly pulled and broken off at the cutout 111 when the mono-battery 1 serving as the soft package battery is involved in flatulence, so as to improve the use safety. When the cutout 111 and the above curved portion C or the bent piece T are used together, the corresponding first electrode tab 11A or second electrode tab 11B can be correspondingly pulled and broken off more easily at the cutout 111 when the mono-battery 1 serving as the soft package battery is involved in flatulence, so as to further improve the use safety.

In an embodiment, referring to FIG. 10 and FIG. 11 and in combination with FIG. 7, the mono-battery 1 further have an end packaging edge 13, the first electrode tab 11A and the second electrode tab 11B extend out from the corresponding end packaging edges 13 respectively, and at least one end packaging edge 13 is provided with at least a notch 131. By virtue of the notch 131, the mono-battery 1 is broken at the notch 131 when the mono-battery 1 serving as the soft package battery is involved in flatulence, the internal pressure of the mono-battery 1 is released, so as to improve the use safety.

Hereinafter an assembling process of the battery module according to the present disclosure will be briefly described in combination with FIG. 1.

Firstly, the supporting frame 3 is inserted into the upper latching groove 211 and the lower latching groove 212 of the side plate 21, so as to fix the supporting frame 3, and the temperature control tube 5 is put into the supporting frame 3, the mono-batteries 1 are put into the corresponding battery receiving holes 35 on the supporting frame 3 in order, so as to ensure that the side packaging edge 12 of the mono-battery 1 and the battery positioning groove 36 of the supporting frame 3 are in one-to-one correspondence, and ensure that the each side surface of the mono-battery 1 can contact the temperature control tube 5; after all the mono-batteries 1 are put into the supporting frame 3, potting is performed via the potting holes 31 of the supporting frame 3. Because the liquidity of the precursor (monomer of polymer or prepolymer) in fluid state or solution (polymer solution or inorganic matter solution) which is cured to form the separating body 4 is high, which can flow toward the center, the vent hole 37 can allow the flow to be more uniform and discharge the air bubbles in time. After potting is performed and after the separating body 4 is completely solidified, the first upper piece body 61A, the second upper piece body 61B and the lower piece body 62 of the connecting piece 6 are positioned by that the upper positioning pins 321 and the upper positioning holes 612A, 612B are engaged and the lower positioning pin 331 and the lower positioning hole 623 are engage, then the first upper piece body 61A and the second upper piece body 61B of the connecting piece 6 are fixed on the upper supporting frame portion 32, and the first electrode tab 11A at the upper part of the corresponding mono-battery 1 is correspondingly welded on the first upper piece body 61A and the second electrode tab 11B at the upper part of the corresponding mono-battery 1 is correspondingly welded on the second upper piece body 61B. Similarly, the lower piece body 62 of the connecting piece 6 is fixed on the lower supporting frame portion 33, and the second electrode tab 11B at the lower part of the corresponding mono-battery 1 and the first electrode tab 11A at the lower part of the corresponding mono-battery 1 are correspondingly welded on the lower piece body 62. When welding is finished, the lower cover 23, the upper cover 22 and the side cover 24 are fit into the supporting frame 3 in order via the snap-fit structure.

The present disclosure provided herein describes features in terms of specific embodiments. Numerous other embodiments, modifications and variations within the scope and spirit of the appended claims will occur to persons of ordinary skill in the art from a review of this disclosure.

What is claimed is:

1. A battery module, comprising:
    a plurality of mono-batteries arranged in a manner that side surfaces are adjacent to each other;
    an insulative casing receiving the plurality of mono-batteries;
    a supporting frame fixed in the insulative casing, provided with a potting hole, and holding the plurality of mono-batteries therein; and
    a separating body which is formed by injecting via the potting holes and curing and is potted among the adjacent mono-batteries, so as to allow the plurality of mono-batteries to be insulated and isolated from each other;
    the insulative casing further comprising:
        a side plate surrounding three sides of an assembly of the plurality of mono-batteries;
        an upper cover connected to the side plate in a sealing way above the side plate;
        a lower cover connected to the side plate in a sealing way below the side plate; and
        a side cover connected to the side plate, the upper cover and the lower cover in a sealing way on the other side of the assembly of the plurality of mono-batteries;
    wherein
    the side plate of the insulative casing is provided with an upper latching groove and a lower latching groove;
    the supporting frame comprises:
        an upper supporting frame portion engaged with the upper latching groove of the side plate; and
        a lower supporting frame portion spaced apart from the upper supporting frame portion and located below the upper supporting frame portion and engaged with the lower latching groove of the side plate.

2. The battery module according to claim 1, wherein the upper supporting frame portion and the lower supporting frame portion are provided with battery receiving holes formed in pairs correspondingly, the each mono-battery is inserted into the respective pair of battery receiving holes.

3. The battery module according to claim 2, wherein the mono-battery is a soft package battery, the mono-battery has a side packaging edge;
    the each battery receiving hole of the upper supporting frame portion and the lower supporting frame portion is provided with a battery positioning groove at an edge of the each battery receiving hole, so as to correspondingly receive and fix the side packaging edge of the corresponding mono-battery.

4. The battery module according to claim 2, wherein the upper supporting frame portion is provided with vent holes provided between the adjacent battery receiving holes.

5. The battery module according to claim 1, wherein
    the supporting frame further comprises: staggered ribs provided on the lower supporting frame portion and located between the adjacent battery receiving holes;
    the battery module further comprises: a temperature control tube provided with a heat-transfer medium therein, provided in the supporting frame by latching on the staggered ribs of the lower supporting frame portion, and in contact with side surfaces of the each mono-battery, and two end portions of the temperature control tube pass through the side cover, and the temperature control tube is encapsulated by the potted separating body except parts of the temperature control tube in contact with the side surfaces of the each mono-battery.

6. A battery module, comprising:
    a plurality of mono-batteries arranged in a manner that side surfaces are adjacent to each other;
    an insulative casing receiving the plurality of mono-batteries;
    a supporting frame fixed in the insulative casing, provided with a potting hole, and holding the plurality of mono-batteries therein; and
    a separating body which is formed by injecting via the potting holes and curing and is potted among the adjacent mono-batteries, so as to allow the plurality of mono-batteries to be insulated and isolated from each other;
    wherein
    the plurality of mono-batteries each have a first electrode tab and a second electrode tab which are opposite in electrical polarity;
    the battery module further comprises: a connecting piece electrically connecting the first electrode tabs and the second electrode tabs of the plurality of mono-batteries, and provided with a first master output end and a second master output end which are opposite in electrical polarity.

7. The battery module according to claim 6, wherein the connecting piece comprising:
    a first upper piece body and a second upper piece body provided between the insulative casing and an upper part of the plurality of mono-batteries, provided with the first master output end and the second master output end which are opposite in electrical polarity, respectively, the first upper piece body electrically connects the first electrode tab at the upper part of the corresponding mono-battery of the plurality of mono-batteries, the second upper piece body electrically connects the second electrode tab at the upper part of the corresponding mono-battery of the plurality of mono-battery; and
    a lower piece body provided between the insulative casing and a lower part of the plurality of mono-batteries and comprising:
        a first connecting portion electrically connecting the second electrode tab at the lower part of the mono-battery connected to the first upper piece body of the plurality of mono-batteries; and
        a second connecting portion electrically connecting the first electrode tab at the lower part of the mono-battery connected to the second upper piece body of the plurality of mono-batteries, and electrically connected to the first connecting portion.

8. The battery module according to claim 7, wherein at least one of the first upper piece body, the second upper piece body and the lower piece body has a curved portion, so as to allow the corresponding one of the first electrode tab and the second electrode tab of the corresponding mono-battery to bend, abut against and be weld on the curved portion.

9. The battery module according to claim 7, wherein
the first upper piece body has first welding holes, the each first welding hole allows the first electrode tab at the upper part of the corresponding mono-battery of the plurality of mono-batteries to pass through and be weld on the first upper piece body;
the second upper piece body has second welding holes, the each second welding hole allows the second electrode tab at the upper part of the corresponding mono-battery of the plurality of mono-batteries to pass through and be weld on the second upper piece body;
the first connecting portion of the lower piece body has third welding holes, the each third welding hole allows electrical connection of the second electrode tab at the lower part of the mono-battery connected to the first upper piece body of the plurality of mono-batteries;
the second connecting portion of the lower piece body has fourth welding holes, the each fourth welding hole allows electrical connection of the first electrode tab at the lower part of the mono-battery connected to the second upper piece body of the plurality of mono-batteries.

10. The battery module according to claim 9, wherein at least one of the first welding hole, the second welding hole, the third welding hole and the fourth welding hole is formed with a bent piece which is integrally formed, so as to allow the corresponding one of the first electrode tab and the second electrode tab of the corresponding mono-battery to bend, abut against and be weld on the corresponding one bent piece of the first upper piece body, the second upper piece body, and the lower piece body.

11. A battery module, comprising:
a plurality of mono-batteries arranged in a manner that side surfaces are adjacent to each other;
an insulative casing receiving the plurality of mono-batteries;
a supporting frame fixed in the insulative casing, provided with a potting hole, and holding the plurality of mono-batteries therein; and
a separating body which is formed by injecting via the potting holes and curing and is potted among the adjacent mono-batteries, so as to allow the plurality of mono-batteries to be insulated and isolated from each other;
wherein the mono-battery is a soft package battery, the mono-battery has an end packaging edge, the first electrode tab and the second electrode tab extend out from the corresponding end packaging edges respectively, and at least one of the first electrode tab and the second electrode tab is provided with at least one cutout.

12. The battery module according to claim 8, wherein the mono-battery is a soft package battery, the mono-battery has an end packaging edge, the first electrode tab and the second electrode tab extend out from the corresponding end packaging edges respectively, and at least one of the first electrode tab and the second electrode tab is provided with at least a cutout.

13. The battery module according to claim 10, wherein the mono-battery is a soft package battery, the mono-battery has an end packaging edge, the first electrode tab and the second electrode tab extend out from the corresponding end packaging edges respectively, and at least one of the first electrode tab and the second electrode tab is provided with at least a cutout.

14. The battery module according to claim 6, wherein the mono-battery has an end packaging edge, the first electrode tab and the second electrode tab extend out from the corresponding end packaging edges respectively, and at least an end packaging edge is provided with at least a notch.

15. The battery module according to claim 10, wherein the mono-battery has an end packaging edge, the first electrode tab and the second electrode tab extend out from the corresponding end packaging edges respectively, and at least an end packaging edge is provided with at least a notch.

16. The battery module according to claim 11, wherein at least one end packaging edge is provided with at least a notch.

17. The battery module according to claim 12, wherein at least one end packaging edge is provided with at least a notch.

18. The battery module according to claim 13, wherein at least one end packaging edge is provided with at least a notch.

19. The battery module according to claim 6, wherein the insulative casing comprises:
a side plate surrounding three sides of an assembly of the plurality of mono-batteries;
an upper cover connected to the side plate in a sealing way above the side plate;
a lower cover connected to the side plate in a sealing way below the side plate; and
a side cover connected to the side plate, the upper cover and the lower cover in a sealing way on the other side of the assembly of the plurality of mono-batteries.

20. The battery module according to claim 11, wherein the insulative casing comprises:
a side plate surrounding three sides of an assembly of the plurality of mono-batteries;
an upper cover connected to the side plate in a sealing way above the side plate;
a lower cover connected to the side plate in a sealing way below the side plate; and
a side cover connected to the side plate, the upper cover and the lower cover in a sealing way on the other side of the assembly of the plurality of mono-batteries.

* * * * *